(12) United States Patent
Yoo et al.

(10) Patent No.: US 11,876,210 B2
(45) Date of Patent: **\*Jan. 16, 2024**

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Energy Solution, Ltd., Seoul (KR)

(72) Inventors: Tae Gu Yoo, Daejeon (KR); Young Uk Park, Daejeon (KR); Jin Tae Hwang, Daejeon (KR); Wang Mo Jung, Daejeon (KR); Sung Bin Park, Daejeon (KR)

(73) Assignee: LG Energy Solution, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 18/195,089

(22) Filed: May 9, 2023

(65) Prior Publication Data

US 2023/0275209 A1 Aug. 31, 2023

Related U.S. Application Data

(63) Continuation of application No. 17/041,233, filed as application No. PCT/KR2019/003820 on Apr. 1, 2019, now Pat. No. 11,799,066.

(30) Foreign Application Priority Data

Apr. 6, 2018 (KR) .................. 10-2018-0040424

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0471* (2013.01); *H01M 4/134* (2013.01);
(Continued)

(58) Field of Classification Search
None
See application file for complete search history.

(56) References Cited

U.S. PATENT DOCUMENTS

2013/0209885 A1    8/2013   Paulsen et al.
2016/0028082 A1    1/2016   Choi et al.
(Continued)

FOREIGN PATENT DOCUMENTS

CN    105070907 A    11/2015
CN    106505195 A    3/2017
(Continued)

OTHER PUBLICATIONS

Search report from International Application No. PCT/KR2019/003820, dated Jul. 17, 2019.
(Continued)

*Primary Examiner* — Wyatt P McConnell
(74) *Attorney, Agent, or Firm* — Lerner David LLP

(57) ABSTRACT

A positive electrode active material includes a lithium transition metal oxide, which is doped with doping element $M^2$, wherein $M^2$ includes at least one of Al, Ti, Mg, Zr, W, Y, Sr, Co, F, Si, Na, Cu, Fe, Ca, S, or B, and contains nickel in an amount of 60 mol % or more based on a total number of moles of transition metals excluding lithium, wherein the lithium transition metal oxide has a single particle form, and includes a center portion having a layered structure and a surface portion having a rock-salt structure, and the doping element $M^2$ is included in an amount of 3,580 ppm to 7,620 ppm based on a total weight of the positive electrode active material.

14 Claims, 6 Drawing Sheets

(51) Int. Cl.
   *H01M 4/134*     (2010.01)
   *H01M 4/1391*    (2010.01)
   *H01M 4/1395*    (2010.01)
   *H01M 4/36*      (2006.01)
   *H01M 4/525*     (2010.01)
   *H01M 10/0525*   (2010.01)
   *H01M 4/02*      (2006.01)

(52) U.S. Cl.
   CPC ....... *H01M 4/1391* (2013.01); *H01M 4/1395* (2013.01); *H01M 4/364* (2013.01); *H01M 4/366* (2013.01); *H01M 4/525* (2013.01); *H01M 10/0525* (2013.01); *H01M 2004/028* (2013.01)

(56) References Cited

U.S. PATENT DOCUMENTS

| | | |
|---|---|---|
| 2016/0181611 A1 | 6/2016 | Cho et al. |
| 2016/0211517 A1 | 7/2016 | Beck et al. |
| 2018/0013130 A1 | 1/2018 | Ochiai et al. |
| 2018/0048015 A1 | 2/2018 | Lee et al. |
| 2018/0145368 A1* | 5/2018 | Ochiai .............. H01M 10/0568 |
| 2019/0036119 A1 | 1/2019 | Lee et al. |

FOREIGN PATENT DOCUMENTS

| | | |
|---|---|---|
| EP | 3388394 A1 | 10/2018 |
| KR | 20130065694 A | 6/2013 |
| KR | 20130084361 A | 7/2013 |
| KR | 20140081663 A | 7/2014 |
| KR | 20160045029 A | 4/2016 |
| KR | 20160074236 A | 6/2016 |
| KR | 20170038485 A | 4/2017 |
| KR | 20170075437 A | 7/2017 |
| KR | 20170075596 A | 7/2017 |
| KR | 20170076348 A | 7/2017 |
| KR | 20170100534 A | 9/2017 |
| KR | 20180004672 A | 1/2018 |
| WO | 2014157743 A1 | 10/2014 |
| WO | 2018008952 A1 | 1/2018 |

OTHER PUBLICATIONS

Schipper, Florian, et al., "Review-Recent Advances and Remaining Challenges for Lithium Ion Battery Cathodes." Journal of the Electrochemical Society, vol. 164, No. 1, Published Dec. 8, 2016, pp. A6220-A6228.
Extended Search Report for EP19781656.4 dated May 6, 2021, 7 pgs.
Search Report dated Dec. 6, 2022 from the Office Action for Chinese Application No. 201980021816.3 dated Dec. 13, 2022, 2 pages. [See p. 1, categorizing the cited references].

* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

The present application is a continuation of U.S. application Ser. No. 17/041,233, filed on Sep. 24, 2020, which is a national phase entry under 35 U.S.C. § 371 of 10 International Application No. PCT/KR2019/003820, filed on Apr. 1, 2019, which claims priority from Korean Patent Application No. 10-2018-0040424, filed on Apr. 6, 2018, the disclosures of which are incorporated herein in their entirety by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has very poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co), manganese (Mn), or aluminum (Al), has been developed.

However, with respect to the lithium nickel cobalt metal oxide, structural stability and capacity are low, the nickel is oxidized from $Ni^{2+}$ to $Ni^{3+}$ or $Ni^{4+}$ as charge and discharge proceed particularly when the amount of nickel is increased to increase capacity characteristics, and, accordingly, since rapid oxygen desorption proceeds, there is a limitation in that the structural stability is further reduced.

Thus, there is a need to develop a positive electrode active material which includes a lithium nickel cobalt metal oxide having a high Ni content that exhibits high capacity characteristics, wherein a high-capacity and long-life battery may be prepared due to excellent structural stability of the lithium nickel cobalt metal oxide.

DISCLOSURE OF THE INVENTION

Technical Problem

An aspect of the present invention provides a positive electrode active material which includes a lithium transition metal oxide having a single particle form and doped with a specific amount of a doping element.

Another aspect of the present invention provides a method of preparing the positive electrode active material.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including a lithium transition metal oxide which is doped with doping element $M^2$ (where $M^2$ is at least one selected from the group consisting of aluminum (Al), titanium (Ti), magnesium (Mg), zirconium (Zr), tungsten (W), yttrium (Y), strontium (Sr), cobalt (Co), fluorine (F), silicon (Si), sodium (Na), copper (Cu), iron (Fe), calcium (Ca), sulfur (S), and boron (B)), and contains nickel in an amount of 60 mol % or more based on a total number of moles of transition metals excluding lithium, wherein the lithium transition metal oxide has a single particle form, and includes a center portion having a layered structure and a surface portion having a rock-salt structure, and the doping element $M^2$ is included in an amount of 3,580 ppm to 7,620 ppm based on a total weight of the positive electrode active material.

According to another aspect of the present invention, there is provided a method of preparing a positive electrode active material which includes: mixing a transition metal precursor containing nickel in an amount of 60 mol % or more based on a total number of moles of transition metals, a lithium raw material, and a doping element $M^2$-containing raw material, and sintering the mixture at 800° C. to 1,000° C. to prepare a lithium transition metal oxide having a single particle form, wherein the doping element $M^2$-containing raw material is mixed such that an amount of the doping element $M^2$ is in a range of 3,580 ppm to 7,620 ppm based on a total weight of the positive electrode active material.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

According to the present invention, a positive electrode active material is doped with a specific doping element, but an amount of the doping element is controlled so that life characteristics may be improved at a high voltage when the positive electrode active material is used in a battery.

According to the present invention, a positive electrode active material in the form of a single particle having a grain size of 180 nm to 300 nm may be prepared by oversintering when the positive electrode active material is prepared. When a positive electrode is prepared by using the positive electrode active material, cracks of the positive electrode active material due to rolling in a positive electrode preparation process may be prevented to improve life characteristics of a battery when the positive electrode is used in the battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

A left figure of FIG. 1 is a low-magnification scanning electron microscope (SEM) image of a positive electrode active material prepared in Example 1, and a right figure of FIG. 1 is a high-magnification SEM image of the positive electrode active material prepared in Example 1.

Figure 3:
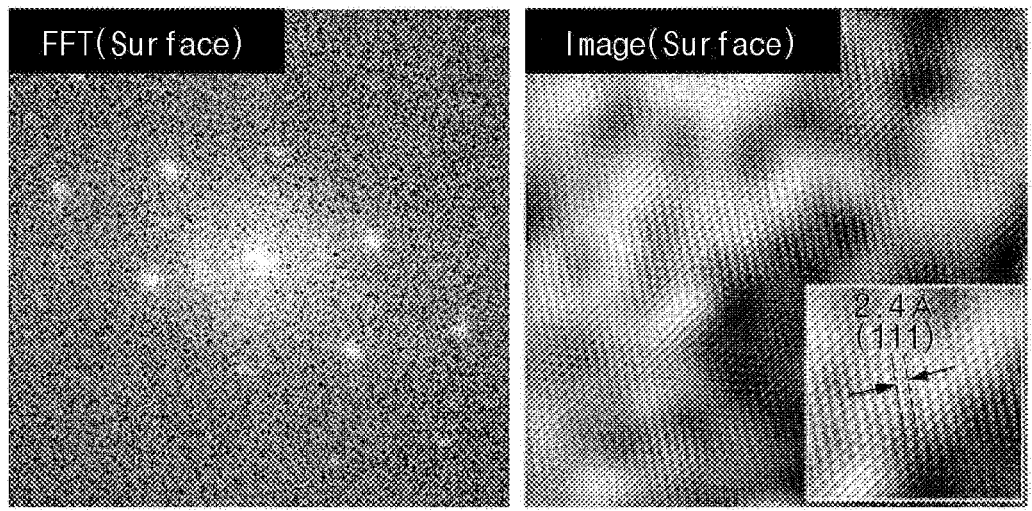
Figure 4:
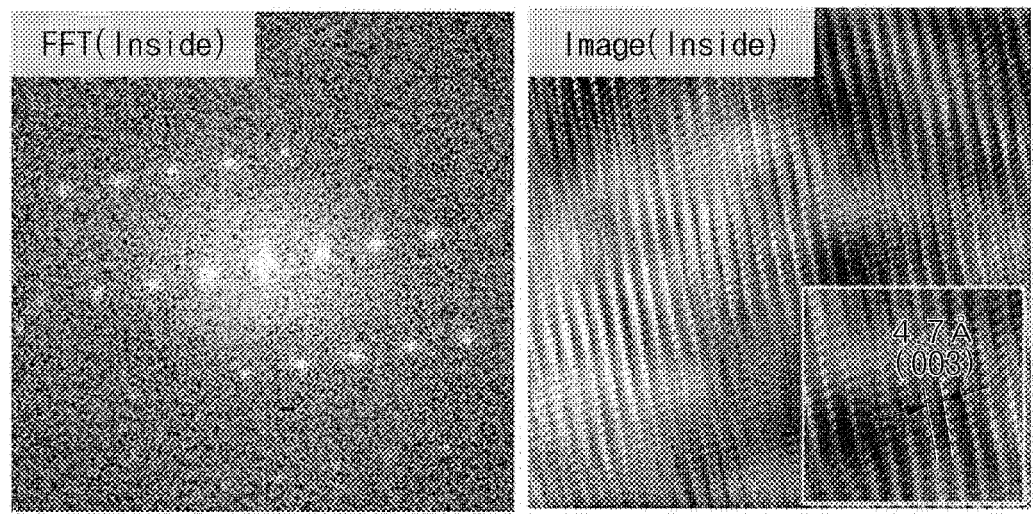
Figure 5:
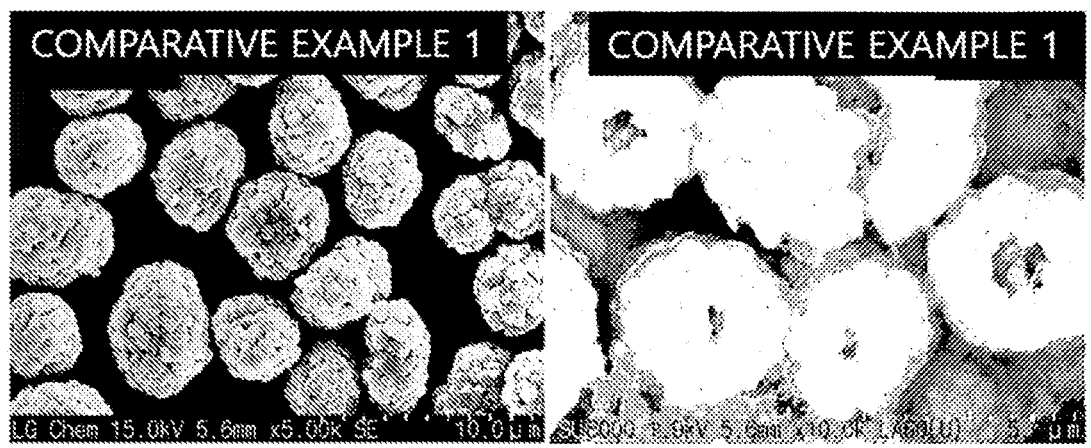
Figure 6:
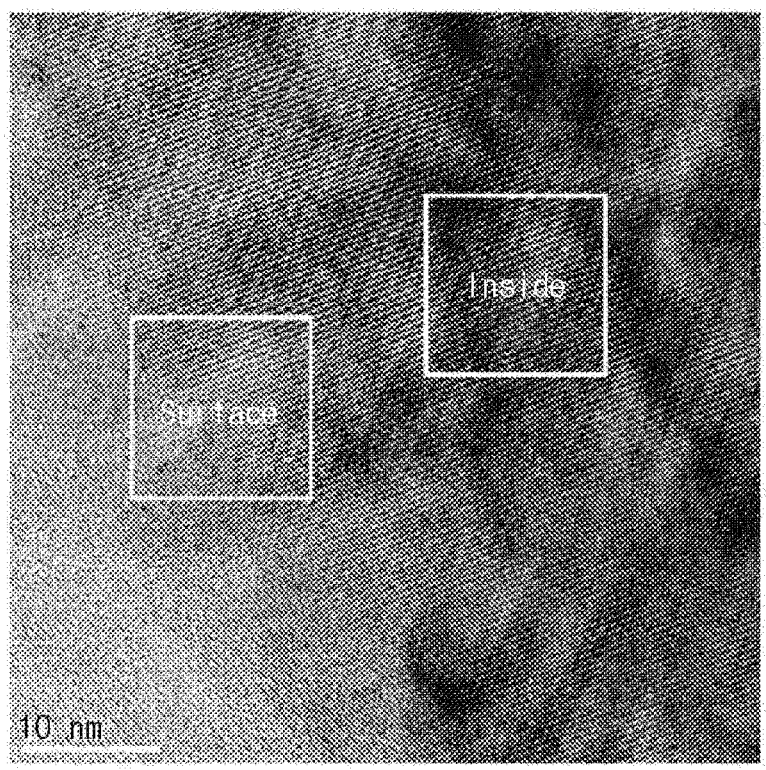
Figure 7:
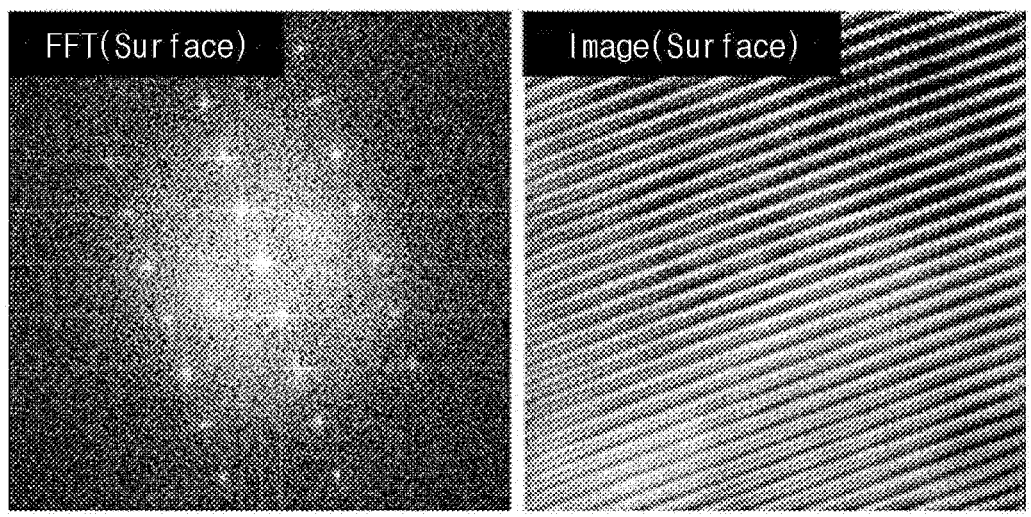
Figure 8:
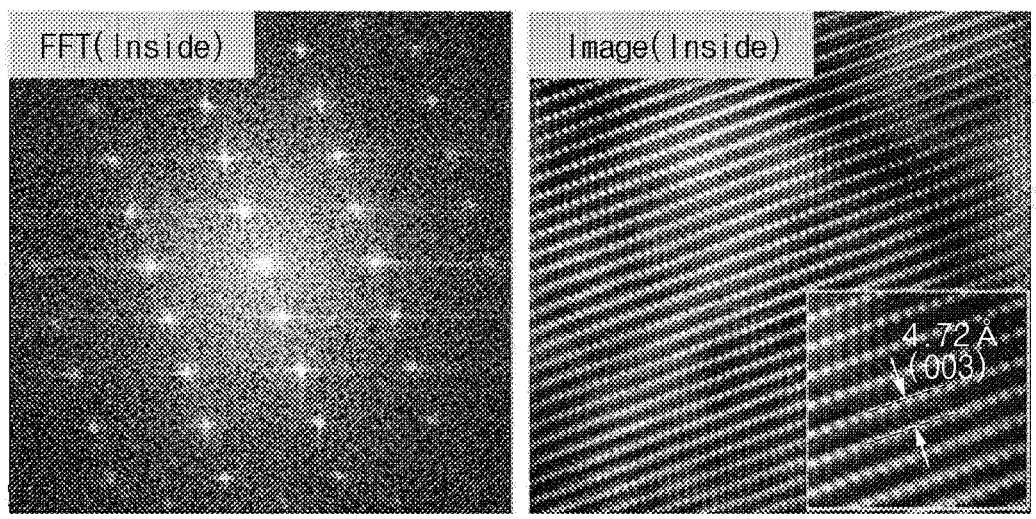
Figure 9:
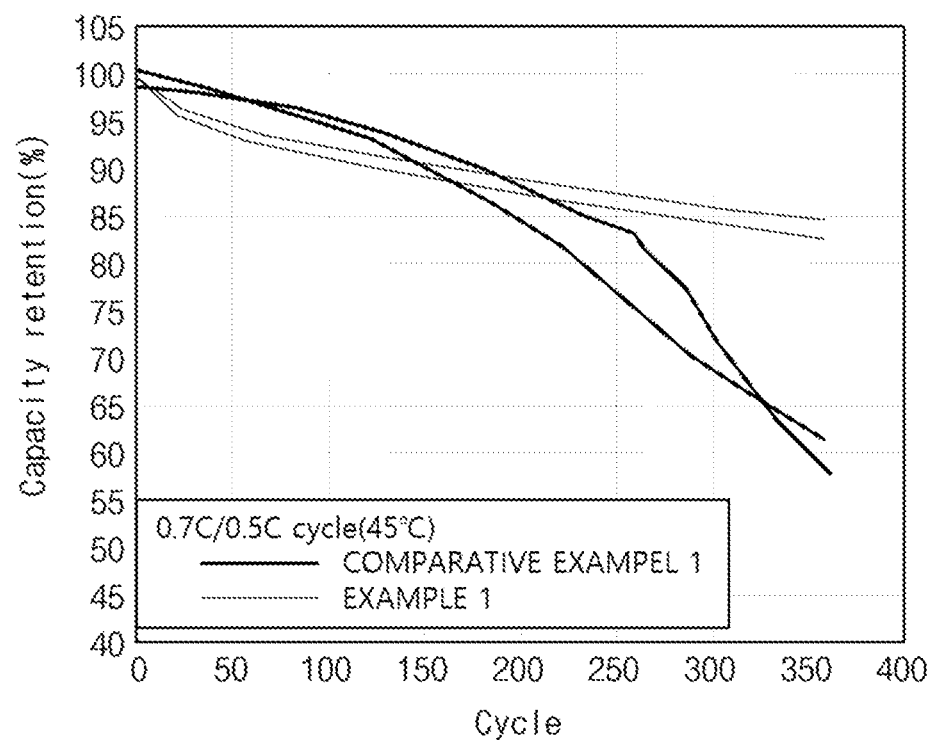
Figure 10:
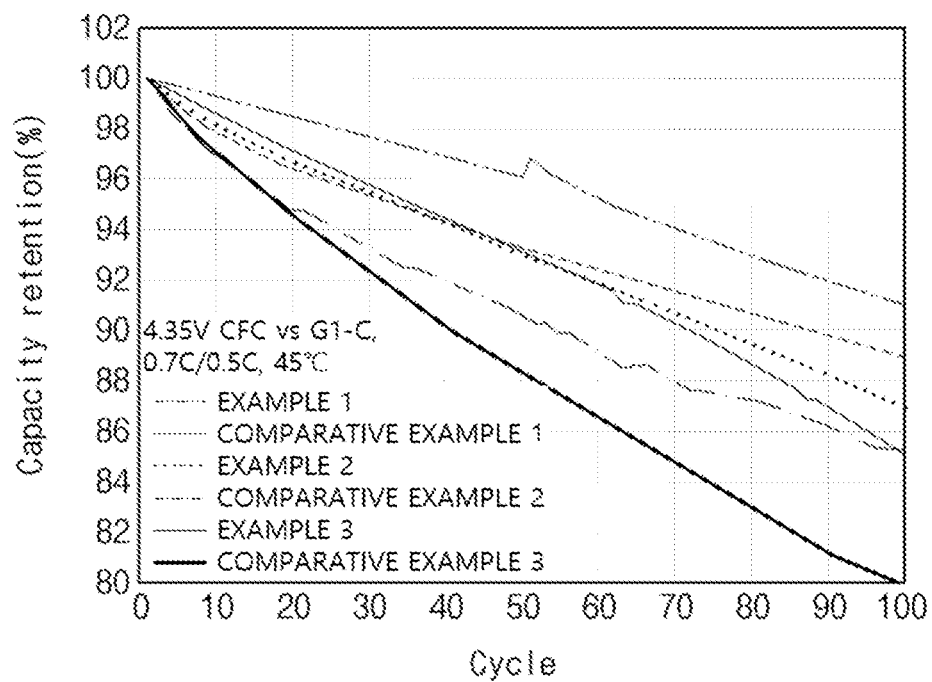

A left figure of FIG. 3 is a fast Fourier transform (FFT) pattern of a surface portion of the positive electrode active material prepared in Example 1, and a right figure of FIG. 3 is a high-magnification TEM image of the surface portion of the positive electrode active material;

A left figure of FIG. 4 is a FFT pattern of a center portion of the positive electrode active material prepared in Example 1, and a right figure of FIG. 4 is a high-magnification TEM image of the center portion of the positive electrode active material;

A left figure of FIG. 5 is a low-magnification scanning electron microscope (SEM) image of a positive electrode active material prepared in Comparative Example 1, and a right FIG. of FIG. 5 is a high-magnification SEM image of the positive electrode active material prepared in Comparative Example 1;

FIG. 6 is a TEM image of the positive electrode active material prepared in Comparative Example 1;

A left figure of FIG. 7 is a fast Fourier transform (FFT) pattern of a surface portion of the positive electrode active material prepared in Comparative Example 1, and a right figure of FIG. 7 is a high-magnification TEM image of the surface portion of the positive electrode active material;

A left figure of FIG. 8 is a FFT pattern of a center portion of the positive electrode active material prepared in Comparative Example 1, and a right figure of FIG. 8 is a high-magnification TEM image of the center portion of the positive electrode active material;

FIG. 9 is a graph illustrating capacity retentions of secondary batteries (mono cells) prepared in Example 1 and Comparative Example 1; and FIG. 10 is a graph illustrating capacity retentions of secondary batteries (full cells) prepared in Examples 1 to 3 and Comparative Examples 1 to 3.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode Active Material

A positive electrode active material according to the present invention includes a lithium transition metal oxide which is doped with doping element $M^2$ (where $M^2$ is at least one selected from the group consisting of aluminum (Al), titanium (Ti), magnesium (Mg), zirconium (Zr), tungsten (W), yttrium (Y), strontium (Sr), cobalt (Co), fluorine (F), silicon (Si), sodium (Na), copper (Cu), iron (Fe), calcium (Ca), sulfur (S), and boron (B)), and contains nickel in an amount of 60 mol % or more based on a total number of moles of transition metals excluding lithium, wherein the lithium transition metal oxide has a single particle form, and includes a center portion having a layered structure and a surface portion having a rock-salt structure. In this case, the doping element $M^2$ is included in an amount of 3,580 ppm to 7,620 ppm based on a total weight of the positive electrode active material.

Specifically, the lithium transition metal oxide, which is doped with the doping element $M^2$ and contains nickel in an amount of 60 mol % or more based on the total number of moles of transition metals excluding lithium, may be used as the positive electrode active material according to the present invention. The doping element $M^2$ may include at least one selected from the group consisting of Al, Ti, Mg, Zr, W, Y, Sr, Co, F, Si, Na, Cu, Fe, Ca, S, and B, and may preferably include at least one selected from the group consisting of Sr, Ti, Mg, and Zr. In a case in which the lithium transition metal oxide containing a high nickel content is doped with the doping element $M^2$, since high capacity characteristics may be exhibited and structural stability of the lithium transition metal oxide at a high voltage may be improved, life characteristics at a high voltage may be improved.

Particularly, the positive electrode active material may include Sr as the doping element $M^2$, and, in a case in which the positive electrode active material includes the Sr, since growth of the positive electrode active material is easy, the positive electrode active material may have a single particle form.

The positive electrode active material may include the doping element $M^2$ in an amount of 3,580 ppm to 7,620 ppm, for example, 4,000 ppm to 7,000 ppm based on the total weight of the positive electrode active material. Life characteristics, initial capacity, and rate capability may be improved by including the doping element $M^2$ in an amount within the above range. For example, in a case in which the doping element $M^2$ is included in an amount of less than 3,580 ppm based on the total weight of the positive electrode active material, the life characteristics may be degraded, and, in a case in which the doping element $M^2$ is included in an amount of greater than 7,620 ppm based on the total weight of the positive electrode active material, the initial capacity and the rate capability may be reduced.

The lithium transition metal oxide may be represented by Formula 1 below:

[Formula 1]

$$Li_{1+a}[Ni_xCo_yM^1_zM^2_w]_{1-a}O_2$$

in Formula 1, $0 \leq a \leq 0.2$, $0.6 \leq x < 1$, $0 < y \leq 0.4$, $0 < z \leq 0.4$, $0 < w \leq 0.1$, for example, $0.02 \leq a \leq 0.06$, $0.6 \leq x \leq 0.8$, $0.1 \leq y \leq 0.3$, $0.1 \leq z \leq 0.3$, $0 < w \leq 0.1$, and $x+y+z+w=1$, $M^1$ includes at least one selected from the group consisting of manganese (Mn) and Al, and $M^2$ includes at least one selected from the group consisting of Al, Ti, Mg, Zr, W, Y, Sr, Co, F, Si, Na, Cu, Fe, Ca, S, and B.

An average particle diameter ($D_{50}$) of the positive electrode active material particles may be in a range of 3.5 μm to 7 μm, for example, 4 μm to 6 μm. In a case in which the average particle diameter ($D_{50}$) of the positive electrode active material satisfies the above range, high energy density may be achieved, capacity may be excellent, and single particles of the positive electrode active material may be easily prepared when the positive electrode active material is oversintered.

The average particle diameter ($D_{50}$) in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm, and may obtain highly repeatable and high resolution results.

The positive electrode active material has a single particle form, and, in this case, the positive electrode active material may have a grain size of 180 nm to 300 nm, for example, 180 nm to 270 nm. For example, in a case in which the grain size of the positive electrode active material is formed to be in a range of 180 nm to 300 nm, the positive electrode active material may exhibit improved rate capability while having a single particle form. For example, in a case in which the grain size of the positive electrode active material is 300 nm or more, the positive electrode active material has a single particle form, but the rate capability may be reduced as the grain size of the positive electrode active material increases, and, in a case in which the grain size of the positive electrode active material is less than 180 nm, the positive electrode active material may not have a single particle form, but may have a form in which primary particles are agglomerated. Since the positive electrode active material has a single particle form, strength of the particle is increased to reduce the occurrence of cracks of the positive electrode active material during charge and discharge of a battery including the positive electrode active material, and, accordingly, a side reaction between the positive electrode active material and an electrolyte solution may also be reduced to improve life characteristics of the battery when the positive electrode active material is used in the battery. The grain size of the positive electrode active material may be measured using an X-ray diffraction (XRD) analyzer.

Also, the positive electrode active material includes a center portion having a layered structure and a surface portion having a rock-salt structure.

The expression "layered structure" denotes a structure in which planes of atoms strongly bonded by covalent bonds or the like and densely arranged are overlapped in parallel by a weak binding force such as a van der Waals force. With respect to a lithium transition metal oxide having a layered structure, intercalation and deintercalation of lithium ions are possible because the lithium ions, transition metal ions, and oxygen ions are densely arranged, specifically, a metal oxide layer composed of transition metal and oxygen and an oxygen octahedral layer surrounding lithium are alternatingly arranged with each other, and a Coulomb repulsive force acts between the metal oxide layers, and ionic conductivity is high because the lithium ions diffuse along a two-dimensional plane. Thus, with respect to the positive electrode active material having a layered structure, since the lithium ions may quickly and smoothly move in the particle to facilitate the intercalation and deintercalation of the lithium ions, initial internal resistance of the battery may be reduced, and thus, discharge capacity and life characteristics may be further improved without worrying about the degradation of rate capability and initial capacity characteristics.

The expression "rock-salt structure" denotes a face-centered cubic structure in which a metal atom is coordinated by surrounding six oxygen atoms arranged in an octahedral form. A compound having the rock-salt structure has high structural stability, particularly, high structural stability at high temperature.

In a case in which the positive electrode active material includes both the center portion having a layered structure and the surface portion having a rock-salt structure as described above, structural stability and thermal stability of the positive electrode active material may be further improved.

Particularly, in a case in which the surface portion denotes a region located within 100 nm, preferably 80 nm, and most preferably 50 nm from a surface of the positive electrode active material particle in a particle center direction, an effect of improving the structural stability and thermal stability may be more significant, and life characteristics of the secondary battery may be improved when the positive electrode active material is used in the battery.

The positive electrode active material according to the present invention may further selectively include a coating element $M^3$-containing coating layer that is formed on a surface of the lithium transition metal oxide, if necessary. In this case, $M^3$ may include at least one selected from the group consisting of Al, Ti, Mg, Zr, W, Y, Sr, Co, F, Si, Na, Cu, Fe, Ca, S, and B, and may preferably be different from the doping element $M^2$.

For example, since a contact between the positive electrode active material and the electrolyte solution included in the lithium secondary battery is blocked by the coating layer to suppress the occurrence of the side reaction, the life characteristics may be improved when used in the battery and, in addition, packing density of the positive electrode active material may be increased.

As described above, in a case in which the coating element is further included, the doping element $M^2$ and the coating element $M^3$ may be included such that a total amount of the doping element $M^2$ and the coating element $M^3$ is in a range of 4,580 ppm to 9,120 ppm, for example, 5,000 ppm to 7,000 ppm based on the total weight of the positive electrode active material. For example, the doping element $M^2$ may be included in an amount of 3,580 ppm to 7,620 ppm, or both the doping element $M^2$ and the coating element $M^3$ may be included such that the total amount of the doping element $M^2$ and the coating element $M^3$ is in a range of 4,580 ppm to 9,120 ppm. In a case in which the doping element $M^2$ and/or the coating element $M^3$ are included in a total amount of 4,580 ppm to 9,120 ppm based on the total weight of the positive electrode active material as described above, since the structural stability is improved and the side reaction between the lithium transition metal oxide and the electrolyte solution is suppressed by the coating layer, the life characteristics of the battery at a high voltage may be improved when the positive electrode active material is used in the battery.

The coating layer may be formed across an entire surface of the positive electrode active material and may be partially formed. Specifically, in a case in which the coating layer is partially formed on the surface of the positive electrode active material, the coating layer may be formed in an area of 20% or more to less than 100% of a total surface area of the positive electrode active material.

Method of Preparing Positive Electrode Active Material

Next, a method of preparing a positive electrode active material according to the present invention will be described.

Specifically, in order to prepare the positive electrode active material according to the present invention, the method includes mixing a transition metal precursor containing nickel in an amount of 60 mol % or more based on a total number of moles of transition metals, a lithium raw material, and a doping element $M^2$-containing raw material, and sintering the mixture at 800° C. to 1,000° C. to prepare a lithium transition metal oxide having a single particle form, wherein the doping element $M^2$-containing material is mixed such that an amount of the doping element $M^2$ is in a range of 3,580 ppm to 7,620 ppm based on a total weight of the positive electrode active material.

More specifically, a transition metal precursor containing nickel in an amount of 60 mol % or more based on a total number of moles of transition metals, a lithium raw material, and a doping element $M^2$-containing raw material are prepared.

The transition metal precursor may contain nickel in an amount of 60 mol % or more based on the total number of moles of transition metals, and may preferably be represented by $Ni_{x1}Co_{y1}M^1_{z1}(OH)_2$ (where $0.6 \leq x1 < 1$, $0 << y1 \leq 0.4$, and $0 < z1 \leq 0.4$).

The lithium raw material may be used without particular limitation as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

As the doping element $M^2$-containing raw material, doping element $M^2$ (where $M^2$ includes at least one selected from the group consisting of Al, Ti, Mg, Zr, W, Y, Sr, Co, F, Si, Na, Cu, Fe, Ca, S, and B) -containing sulfate, nitrate, acetic acid salt, halide, hydroxide, or oxyhydroxide may be used, and any doping element $M^2$-containing raw material is used without particularly limitation as long as it may be dissolved in a solvent such as water.

Particularly, the positive electrode active material may include Sr as the doping element $M^2$, and, in a case in which the positive electrode active material includes the Sr, since the positive electrode active material grows due to the Sr during the sintering, the positive electrode active material may have a single particle form. For example, in a case in which the positive electrode active material does not include the Sr as the doping element $M^2$, the growth of the positive electrode active material is difficult even if the positive electrode active material is sintered at high temperature, and, accordingly, the positive electrode active material may not have a single particle form.

Subsequently, the transition metal precursor, the lithium raw material, and the doping element $M^2$-containing raw material are mixed and sintered at 800° C. to 1,000° C. to prepare a lithium transition metal oxide having a single particle form. Specifically, the sintering may be performed in a temperature range such that a grain size of the lithium transition metal oxide finally prepared is in a range of 180 nm to 300 nm. For example, the sintering temperature may be appropriately adjusted depending on the amount of the nickel included in the transition metal precursor, and, for example, the sintering temperature may be decreased from 1,000° C. to 800° C. as the amount of the nickel included in the transition metal precursor is increased. For example, in a case in which the amount of the nickel included in the transition metal precursor is in a range of 60 mol % or more to less than 70 mol %, the sintering temperature may be in a range of 900° C. to 1,000° C., for example, 900° C. to 950° C. For example, in a case in which the amount of the nickel included in the transition metal precursor is in a range of 70 mol % or more to less than 80 mol %, the sintering temperature may be in a range of greater than 830° C. to 900° C. or less, for example, 850° C. to 900° C. For example, in a case in which the amount of the nickel included in the transition metal precursor is in a range of 80 mol % or more to less than 90 mol %, the sintering temperature may be in a range of 800° C. to 900° C., for example, 820° C. to 900° C.

The sintering may be performed at 800° C. to 1,000° C. for 15 hours to 30 hours in an oxygen or air atmosphere. Since the oversintering is performed at 800° C. to 1,000° C. for 15 hours to 30 hours as described above, the positive electrode active material is recrystallized to be formed in a single particle form, and an amount of residual lithium remaining on the surface of the positive electrode active material may be reduced due to the high-temperature sintering. Gas generation due to a side reaction between the residual lithium and the electrolyte solution may be prevented in advance due to the effect of reducing the residual lithium. Also, oxygen may be desorbed from the surface of the lithium transition metal oxide having a layered structure due to the oversintering and the amount of manganese included, and $Ni^{2+}$ ions are generated so that the surface of the positive electrode active material may be changed into a rock-salt structure.

The method may further selectively include forming a coating layer on a surface of the above-prepared positive electrode active material, if necessary. For example, a coating layer may be formed on the surface of the positive electrode active material by mixing the above-prepared positive electrode active material and a coating element $M^3$-containing raw material (where $M^3$ includes at least one selected from the group consisting of Al, Ti, Mg, Zr, W, Y, Sr, Co, F, Si, Na, Cu, Fe, Ca, S, and B) and performing a heat treatment.

The heat treatment may be performed at 350° C. to 800° C. for 3 hours to 10 hours in an oxygen or air atmosphere, and may more preferably be performed at 400° C. to 500° C. for 3 hours to 6 hours. In a case in which the heat treatment is performed within the above range, since the coating layer is easily formed on the surface of the lithium transition metal oxide to not only suppress the side reaction with the electrolyte solution, but also reduce the residual lithium, gas generation due to the residual lithium present on the surface during charge and discharge may be significantly reduced.

Preferably, with respect to the positive electrode active material, the doping element $M^2$-containing raw material and the coating element $M^3$-containing raw material may be mixed such that a total amount of the doping element $M^2$ and the coating element $M^3$ is in a range of 4,580 ppm to 9,120 ppm based on the total weight of the positive electrode active material. For example, in a case in which the doping element $M^2$-containing raw material and the coating element $M^3$-containing raw material are mixed such that the total amount of the doping element $M^2$ and the coating element $M^3$ is less than 4,580 ppm or greater than 9,120 ppm, the initial capacity, rate capability, and life characteristics may be reduced when the positive electrode active material is used in the battery.

Positive Electrode

Next, provided is a positive electrode for a lithium secondary battery which includes the positive electrode active material according to the present invention.

Specifically, provided is the positive electrode for a lithium secondary battery which includes a positive electrode collector, and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may selectively include a conductive agent, a binder, and a dispersant, if necessary, in addition to the above positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder, the conductive agent, and the dispersant, if necessary, in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, the separator may include one coated with a safety reinforced separator (SRS) which is prepared by coating ceramic particles and a binder polymer on a polyolefin-based or polyester-based resin separator base material. The ceramic particles may improve thermal stability of the separator, and, accordingly, may prevent shrinkage of the separator at high temperature. The binder polymer fixes the ceramic particles to the separator base material. A pore structure may be formed on a surface of the SRS coating layer which is formed on the surface of the separator by the ceramic particles. Ions may smoothly move from the positive electrode to the negative electrode by pores formed on the surface of the SRS coating layer even if the ceramic particles are coated on the separator. Also, the binder polymer may improve mechanical stability of the separator by stably maintaining the ceramic particles on the separator and may more stably adhere the separator to the electrode.

In this case, an organic/inorganic composite separator further coated with an inorganic material may be used to secure heat resistance or mechanical strength, and the organic/inorganic composite separator having a single layer or multilayer structure may be selectively used.

The inorganic material may be used without particular limitation as long as it is a material capable of uniformly controlling pores of the organic/inorganic composite separator and improving heat resistance. For example, non-limiting examples of the inorganic material may be at least one selected from the group consisting of $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAl_{O2}$, $SrTiO_3$, $SnO_2$, $CeO_2$, MgO, NiO, CaO, ZnO, $ZrO_2$, SiC, derivatives thereof, and mixtures thereof.

The inorganic material may have an average diameter of 0.001 μm to 10 μm, for example, 0.001 μm to 1 μm. If the average diameter of the inorganic material is within the above range, dispersibility in a coating solution is improved, and the occurrence of problems in a coating process may be minimized. Also, physical properties of the final separator may not only be made uniform, but mechanical properties of the nonwoven fabric may also be improved because the inorganic particles are uniformly distributed in pores of the nonwoven fabric, and it may be easily control a size of the pores of the organic/inorganic composite separator.

An average diameter of the pores of the organic/inorganic composite separator may be in a range of 0.001 μm to 10 μm, for example, 0.001 μm to 1 μm. If the average diameter of the pores of the organic/inorganic composite separator is within the above range, gas permeability and ionic conductivity may not only be controlled in desired ranges, but it is also possible to eliminate the possibility of an internal short circuit of the battery due to a contact between the positive electrode and the negative electrode when the battery is prepared by using the organic/inorganic composite separator.

Porosity of the organic/inorganic composite separator may be in a range of 30 vol % to 90 vol %. In a case in which the porosity is within the above range, the ionic conductivity may be increased and mechanical strength may be improved.

In addition, a typical porous nonwoven fabric, for example, a nonwoven fabric formed of high melting point glass fibers or polyethylene terephthalate fibers may be used, but the separator is not limited thereto.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, propyl acetate, methyl propionate, ethyl propionate, propyl propionate, butyl propionate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, LiN $(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, the electrolyte may further include an additive in addition to the electrolyte components. For example, the additive may include at least one selected from the group consisting of a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, vinylene carbonate (VC), propane sultone (PS), fluoroethylene carbonate (FEC), and butanedinitrile (NA). In this case, the additive may be included in an amount of 0.1 wt % to 5 wt % based on a total weight of the electrolyte.

For example, in a case in which at least one selected from the group consisting of vinylene carbonate (VC), propane sultone (PS), fluoroethylene carbonate (FEC), and butanedinitrile (NA) is included as the additive, the additive may improve output characteristics by forming a stable solid electrolyte interface (SEI) on the negative electrode together with the lithium salt, and, as a result, may improve the output characteristics of the secondary battery when used in a high voltage of 4.3 V or more by suppressing decomposition of the surface of the positive electrode and preventing an oxidation reaction of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Examples

Example 1

Preparation of Positive Electrode Active Material 92.092 g of $Ni_{0.6}Mn_{0.2}Co_{0.2}(OH)_2$, 37.32 g of LiOH, 0.1634 g of $SrCO_3$, 0.4584 g of $ZrO_2$, 0.1163 g of MgO, and 0.0404 g of $TiO_2$ were dry-mixed and then oversintered at 920° C. to 950° C. to prepare a positive electrode active material in which 1,000 ppm of Sr, 3,500 ppm of Zr, 500 ppm of Mg, and 250 ppm of Ti were doped based on a total weight of the positive electrode active material.

Preparation of Positive Electrode

The above-prepared positive electrode active material, a Denka black conductive agent, and a polyvinylidene fluoride (KF1100) binder were mixed in a weight ratio of 96:2:2, and the mixture was mixed in an N-methylpyrrolidone (NMP) solvent to prepare a composition for forming a positive electrode. A 20 μm thick Al current collector was coated with the composition for forming a positive electrode, dried, and then roll-pressed to prepare a positive electrode.

Preparation of Negative Electrode

Artificial graphite (G1-C) as a negative electrode active material, a carbon black conductive agent (super C65), and a styrene butadiene rubber (BM-L301, Zeon Corporation) and carboxymethylcellulose (Daicel 12200, Daicel Fine-Chem Ltd.), as a binder, were mixed in a weight ratio of 95.6:0.75:2.5:1.15, and the mixture was added to an NMP solvent to prepare a composition for forming a negative electrode. A 20 μm thick Cu current collector was coated with the composition for forming a negative electrode, dried, and then roll-pressed to prepare a negative electrode.

Preparation of Secondary Battery

After the above-prepared positive electrode and negative electrode were stacked with an SRS separator to prepare an electrode assembly, the electrode assembly was put in a battery case, and an electrolyte solution, in which 1 M $LiPF_6$ was dissolved in an organic solvent, was injected thereinto to prepare a secondary battery.

In a case in which the secondary battery was prepared as a half-cell, an organic solvent was used in which 2 wt % of vinylene carbonate was added to a mixed solution, in which ethylene carbonate, dimethyl carbonate, and diethyl carbonate were mixed in a ratio of 1:2:1 (vol %), based on a total amount of the mixed solution.

In a case in which the secondary battery was prepared as a full cell, an organic solvent was used in which 0.5 wt % of vinylene carbonate and 1 wt % of propane sultone were added to a mixed solution, in which ethylene carbonate, propyl propionate, and diethyl carbonate were mixed in a ratio of 3:1:6 (vol %), based on a total amount of the mixed solution.

Example 2

A positive electrode and a secondary battery including the same were prepared in the same manner as in Example 1 except that 92.092 g of $Ni_{0.7}Mn_{0.2}Co_{0.1}(OH)_2$, 37.32 g of LiOH, 0.1634 g of $SrCO_3$, 0.4584 g of $ZrO_2$, 0.1163 g of MgO, and 0.0404 g of $TiO_2$ were dry-mixed and then oversintered at 850° C. to 900° C. to prepare a positive electrode active material in which 1,000 ppm of Sr, 3,500 ppm of Zr, 500 ppm of Mg, and 250 ppm of Ti were doped based on a total weight of the positive electrode active material, and the positive electrode active material was used.

Example 3

A positive electrode and a secondary battery including the same were prepared in the same manner as in Example 1 except that 92.092 g of $Ni_{0.8}Mn_{0.1}Co_{0.1}(OH)_2$, 37.32 g of LiOH, 0.1634 g of $SrCO_3$, 0.4584 g of $ZrO_2$, 0.1163 g of MgO, and 0.0404 g of $TiO_2$ were dry-mixed and then sintered at 820° C. to 900° C. for 10 hours to prepare a positive electrode active material having an average particle diameter ($D_{50}$) of 6 μm to 7 μm in which 1,000 ppm of Sr, 3,500 ppm of Zr, 500 ppm of Mg, and 250 ppm of Ti were doped based on a total weight of the positive electrode active material, and the positive electrode active material was used.

Example 4

A positive electrode and a secondary battery including the same were prepared in the same manner as in Example 1 except that 100 g of the Sr, Zr, Mg, and Ti-doped positive electrode active material prepared in Example 1 and 0.141711359 g of $Al_2O_3$ were mixed and sintered at 500° C. for 5 hours to prepare a positive electrode active material having an average particle diameter ($D_{50}$) of 5 μm to 7 μm in which a surface was coated with 1,500 ppm of Al based on a total weight of the positive electrode active material, and the positive electrode active material was used.

Comparative Example 1

A positive electrode active material, a positive electrode, and a secondary battery including the positive electrode were prepared in the same manner as in Example 1 except that sintering was performed at 830° C. to 850° C. for 10 hours during the preparation of the positive electrode active material.

Comparative Example 2

A positive electrode active material, a positive electrode, and a secondary battery including the positive electrode were prepared in the same manner as in Example 2 except that sintering was performed at 810° C. to 830° C. for 10 hours during the preparation of the positive electrode active material.

Comparative Example 3

A positive electrode active material, a positive electrode, and a secondary battery including the positive electrode were prepared in the same manner as in Example 3 except that sintering was performed at 780° C. to 810° C. for 10 hours during the preparation of the positive electrode active material.

Comparative Example 4

92.092 g of $Ni_{0.6}Mn_{0.2}Co_{0.2}(OH)_2$, 37.32 g of LiOH, 0.1634 g of $SrCO_3$, 0.6584 g of $ZrO_2$, 0.5816 g of MgO, and 0.2427 g of $TiO_2$ were dry-mixed and then sintered at 920° C. to 950° C. for 10 hours to prepare a positive electrode active material having an average particle diameter ($D_{50}$) of 5 μm to 7 μm in which 1,000 ppm of Sr, 5,000 ppm of Zr, 2,500 ppm of Mg, and 1,500 ppm of Ti were doped based on a total weight of the positive electrode active material. A positive electrode and a secondary battery including the same were prepared in the same manner as in Example 4 except that the above-prepared positive electrode active material and 0.141711359 g of $Al_2O_3$ were mixed and sintered at 500° C. for 5 hours to prepare a positive electrode active material in which a surface was coated with 1,500 ppm of Al based on a total weight of the positive electrode active material, and the positive electrode active material was used.

Comparative Example 5

92.092 g of $Ni_{0.6}Mn_{0.2}Co_{0.2}(OH)_2$, 37.32 g of LiOH, 0.0817 g of $SrCO_3$, 0.1310 g of $ZrO_2$, 0.0582 g of MgO, and 0.0243 g of $TiO_2$ were dry-mixed and then sintered at 920° C. to 950° C. for 10 hours to prepare a $LiNi_{0.6}Co_{0.3}Mn_{0.2}O_2$ lithium transition metal oxide having an average particle diameter ($D_{50}$) of 5 μm to 7 μm in which 500 ppm of Sr, 1,000 ppm of Zr, 250 ppm of Mg, and 150 ppm of Ti were doped based on a total weight of the positive electrode active material. A positive electrode and a secondary battery including the same were prepared in the same manner as in Example 4 except that the above-prepared positive electrode active material and 0.04723712 g of $Al_2O_3$ were mixed and sintered at 500° C. for 5 hours to prepare a positive electrode active material in which a surface was coated with 500 ppm of Al based on a total weight of the positive electrode active material, and the positive electrode active material was used.

Experimental Example 1: Confirmation of Crystal Structure of Positive Electrode Active Material Particles of the positive electrode active materials prepared in Example 1 and Comparative Example 1 were cut, a cross section of each positive electrode active material was photographed using a transmission electron microscope (TEM), and cross-sectional images were subjected to fast Fourier transform (FFT) to confirm crystal structures of the surface and inside of the positive electrode active material particles by diffraction patterns.

In this regard, FIGS. 1 to 4 illustrate low-magnification (left) and high-magnification (right) SEM images, a cross-sectional transmission electron microscope (TEM) image, a FFT pattern (left) and a TEM image (right) of a surface portion, and a FFT pattern (left) and a TEM image (right) of a center portion of the positive electrode active material prepared in Example 1, respectively, and FIGS. 5 to 8 illustrate low-magnification (left) and high-magnification (right) SEM images, a cross-sectional TEM image, a FFT pattern (left) and a TEM image (right) of a surface portion, and a FFT pattern (left) and a TEM image (right) of a center portion of the positive electrode active material prepared in Comparative Example 1, respectively.

Figure 1:
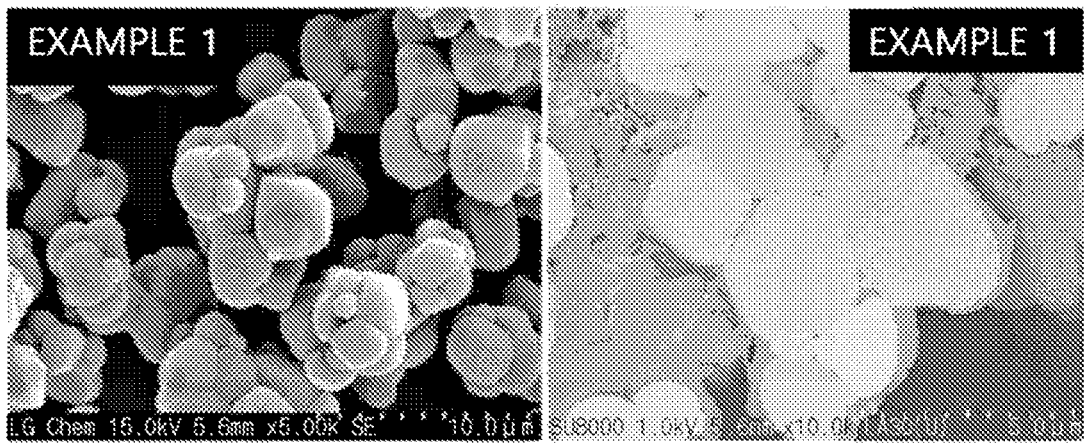
Figure 2:
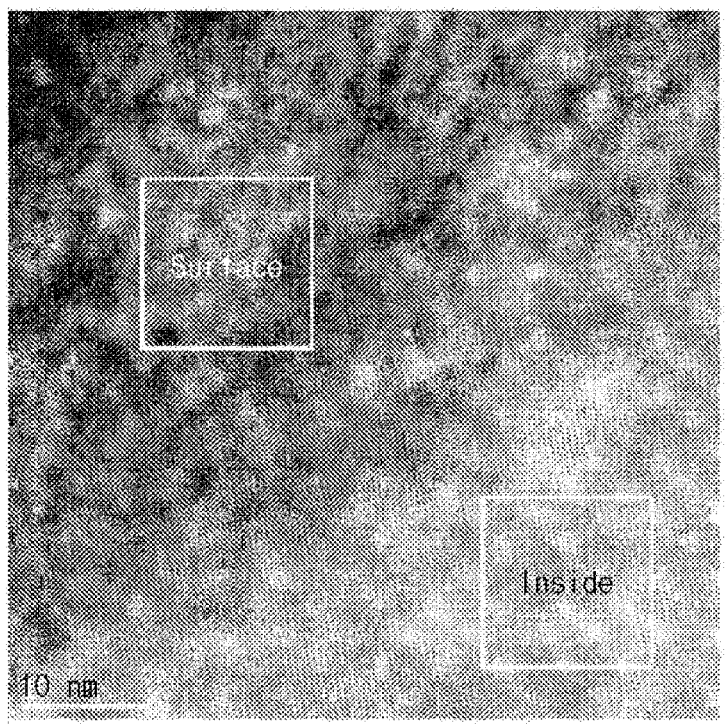
FIG. 2 is a transmission electron microscope (TEM) image of the positive electrode active material prepared in Example 1.

Specifically, the positive electrode active material prepared in Example 1 had a single particle form as illustrated in FIG. 1, and it may be confirmed that crystal structures of the center portion of the particle and a region within 50 nm from the surface of the particle in a center direction were different from each other as illustrated in FIG. 2. In order to confirm the crystal structures of the center portion and the surface portion, the FFT patterns of the center portion (inside) and the surface portion (surface) shown in FIG. 2 were confirmed, and the FFT patterns were illustrated in FIGS. 3 and 4.

As illustrated in a left figure of FIG. 3, it may be confirmed that the surface portion of the positive electrode active material had a rock-salt crystal structure, and it may be confirmed that the center portion of the positive electrode active material had a layered crystal structure as illustrated in a left figure of FIG. 4.

As illustrated in FIGS. 6 to 9, the positive electrode active material prepared in Comparative Example 1 was in the form of a secondary particle which is formed by agglomeration of primary particles, wherein it may be confirmed that the surface portion and the center portion of the particle had the same crystal structure.

Experimental Example 2: Life Characteristics of Secondary Battery (Mono Cell)

Each of the secondary batteries (mono cells) prepared in Examples 1 to 4 and Comparative Examples 1 to 5 was charged at a constant current of 0.7 C to 4.35 V at a high temperature (45° C.). Thereafter, each secondary battery was discharged at a constant current of 0.5 C to a voltage of 3 V. The charging and discharging behaviors were set as one cycle, and, after this cycle was repeated 360 times, life characteristics of the secondary batteries according to Examples 1 to 4 and Comparative Examples 1 to 5 were measured, and the results thereof are presented in the following Table 1 and FIG. 9.

TABLE 1

| | Capacity retention (%) in $360^{th}$ cycle |
|---|---|
| Example 1 | 85 |
| Example 2 | 83 |
| Example 3 | 81 |
| Example 4 | 85 |
| Comparative Example 1 | 60 |
| Comparative Example 2 | 55 |
| Comparative Example 3 | 20 |
| Comparative Example 4 | 88 |
| Comparative Example 5 | 62 |

As illustrated in Table 1, it may be confirmed that the secondary batteries (mono cells) including the positive electrode active materials of Examples 1 to 3, in which all conditions were the same, but sintering conditions were different from one another during the preparation of the positive electrode active materials, had significantly better capacity retentions in the 360$^{th}$ cycle than those of the secondary batteries (mono cells) of Comparative Examples 1 to 3. Also, in contrast to a case in which the amount of the coating element and doping element was in a range of 4,580 ppm and 9,120 ppm as in the present invention, with respect to Comparative Example 5 in which the total amount of the coating element and doping element was less than the above range, it may also be confirmed that the capacity retention of the mono cell was significantly reduced.

Experimental Example 3: High-Temperature Life Characteristics of Secondary Battery (Full Cell)

Each of the secondary batteries (full cells) prepared in Examples 1 to 4 and Comparative Examples 1 to 5 was charged at a constant current of 0.7 C to 4.35 V at a high temperature (45° C.). Thereafter, each secondary battery was discharged at a constant current of 0.5 C to a voltage of 3 V. The charging and discharging behaviors were set as one cycle, and, after this cycle was repeated 100 times, life characteristics of the secondary batteries according to Examples 1 to 4 and Comparative Examples 1 to 5 were measured, and the results thereof are presented in the following Table 2 and FIG. 10.

TABLE 2

| | Capacity retention (%) in 100$^{th}$ cycle |
|---|---|
| Example 1 | 92 |
| Example 2 | 90 |
| Example 3 | 85 |
| Example 4 | 92 |
| Comparative Example 1 | 82 |
| Comparative Example 2 | 78 |
| Comparative Example 3 | 50 |
| Comparative Example 4 | 88 |
| Comparative Example 5 | 70 |

As illustrated in Table 2 and FIG. 10, it may be confirmed that the secondary batteries (full cells) including the positive electrode active materials of Examples 1 to 3, in which all conditions were the same, but sintering conditions were different from one another during the preparation of the positive electrode active materials, had better high-temperature life characteristics than those of the secondary batteries (full cells) of Comparative Examples 1 to 3. Also, in contrast to a case in which the amount of the coating element and doping element was in a range of 4,580 ppm and 9,120 ppm as in the present invention, with respect to Comparative Example 5 in which the total amount of the coating element and doping element was less than the range of the present invention, it may be confirmed that the high-temperature life characteristics of the full cell was significantly reduced.

Experimental Example 4: Capacity Characteristics of Secondary Battery

Each of the secondary batteries (half-cells) prepared in Examples 1, 2, and 4 and Comparative Examples 1 to 3 and 5 was charged at a constant current of 0.7 C to 4.4 V at room temperature (25° C.), and charge capacities were measured (with respect to Example 3 and Comparative Example 3 which included the positive electrode active material having a Ni content of 80 mol %, each secondary battery was charged at a constant current of 0.7 C to 4.25 V). Thereafter, each secondary battery was first discharged at a constant current of 0.5 C to a voltage of 3.0 V, and discharge capacities were measured.

The charge capacities and discharge capacities in a first cycle and discharge efficiency in the first cycle are presented in Table 3 below. In this case, the discharge efficiency in the first cycle was calculated by dividing the discharge capacity in the first cycle by the charge capacity in the first cycle.

TABLE 3

| | Charge capacity (mAh/g) | Discharge capacity (mAh/g) | Efficiency (%) |
|---|---|---|---|
| Example 1 | 213.7 | 187 | 87.5 |
| Example 2 | 218 | 194 | 88.99 |
| Example 3 | 226.8 | 205 | 90.3 |
| Example 4 | 213.7 | 187 | 87.5 |
| Comparative Example 1 | 216 | 192 | 88.8 |
| Comparative Example 2 | 218 | 200 | 91.7 |
| Comparative Example 3 | 226 | 211 | 93.17 |
| Comparative Example 4 | 210 | 165 | 78.5 |
| Comparative Example 5 | 213.7 | 187 | 87.5 |

As illustrated in Table 3, it may be confirmed that the secondary batteries (half-cells) including the positive electrode active materials of Examples 1 to 3, in which all conditions were the same, but sintering conditions were different from one another during the preparation of the positive electrode active materials, exhibited the same level of charge and discharge efficiency as the secondary batteries (half-cells) of Comparative Examples 1 to 3. In contrast, with respect to Comparative Example 4 in which the amount of the coating element and doping element was greater than the range of the present invention, it may be confirmed that the charge and discharge efficiency was significantly reduced in comparison to that of Example 3 of the present invention due to a decrease in energy density of the positive electrode active material.

The invention claimed is:

1. A positive electrode active material comprising:
a lithium transition metal oxide doped with doping element $M^2$,
wherein $M^2$ includes at least one of aluminum (Al), titanium (Ti), magnesium (Mg), zirconium (Zr), tungsten (W), yttrium (Y), strontium (Sr), fluorine (F), silicon (Si), sodium (Na), copper (Cu), iron (Fe), calcium (Ca), sulfur (S), or boron (B), and
wherein the lithium transition metal oxide contains nickel in an amount of 60 mol % or more based on a total number of moles of transition metals excluding lithium,
wherein the lithium transition metal oxide has a single particle form and comprises a center portion having a layered structure and a surface portion having a rocksalt structure, and
the doping element $M^2$ is included in an amount of 3,580 ppm to 7,620 ppm based on a total weight of the positive electrode active material.

2. The positive electrode active material of claim 1, wherein a grain size of the positive electrode active material is in a range of 180 nm to 300 nm.

3. The positive electrode active material of claim 1, wherein the doping element $M^2$ comprises Sr.

4. The positive electrode active material of claim 1, wherein the surface portion is a region located within 100 nm from a surface toward a center of a particle.

5. The positive electrode active material of claim 1, wherein the lithium transition metal oxide is represented by Formula 1:

$$Li_{1+a}[Ni_xCo_yM^1_zM^2_w]_{1-a}O_2 \quad \text{[Formula 1]}$$

wherein, in Formula 1, $0 \leq a \leq 0.2$, $0.6 \leq x < 1$, $0 < y \leq 0.4$, $0 < z \leq 0.4$, $0 < w \leq 0.1$, and $x+y+z+w=1$, $M^1$ comprises manganese (Mn) or Al, and $M^2$ comprises at least one of Al, Ti, Mg, Zr, W, Y, Sr, F, Si, Na, Cu, Fe, Ca, S, or B.

6. The positive electrode active material of claim 1, further comprising a coating element $M^3$-containing coating layer formed on a surface of the lithium transition metal oxide, wherein $M^3$ comprises at least one of Al, Ti, Mg, Zr, W, Y, Sr, Co, F, Si, Na, Cu, Fe, Ca, S, or B.

7. The positive electrode active material of claim 6, wherein a total amount of the doping element $M^2$ and the coating element $M^3$ is in a range of 4,580 ppm to 9,120 ppm based on the total weight of the positive electrode active material.

8. The positive electrode active material of claim 1, wherein the positive electrode active material has an average particle diameter of 3.5 μm to 7 μm.

9. A method of preparing a positive electrode active material, comprising:
mixing a transition metal precursor containing nickel in an amount of 60 mol % or more based on a total number of moles of transition metals, a lithium raw material, and a doping element $M^2$-containing raw material, wherein $M^2$ includes at least one of aluminum (Al), titanium (Ti), magnesium (Mg), zirconium (Zr), tungsten (W), yttrium (Y), strontium (Sr), fluorine (F), silicon (Si), sodium (Na), copper (Cu), iron (Fe), calcium (Ca), sulfur (S), or boron (B), and sintering the mixture at 800° C. to 1,000° C. to prepare a lithium transition metal oxide having a single particle form, wherein the doping element $M^2$-containing raw material is mixed such that an amount of the doping element $M^2$ is in a range of 3,580 ppm to 7,620 ppm based on a total weight of the positive electrode active material.

10. The method of claim 9, further comprising:
forming a coating layer on a surface of the positive electrode active material by mixing the positive electrode active material and a coating element $M^3$-containing raw material, wherein $M^3$ comprises at least one of Al, Ti, Mg, Zr, W, Y, Sr, Co, F, Si, Na, Cu, Fe, Ca, S, or B, and performing a heat treatment.

11. The method of claim 10, wherein the heat treatment is performed at 350° C. to 800° C.

12. The method of claim 10, wherein the doping element $M^2$-containing raw material and the coating element $M^3$-containing raw material are mixed such that a total amount of the doping element $M^2$ and the coating element $M^3$ is in a range of 4,580 ppm to 9,120 ppm based on the total weight of the positive electrode active material.

13. A positive electrode for a lithium secondary battery, the positive electrode comprising the positive electrode active material of claim 1.

14. A lithium secondary battery comprising the positive electrode of claim 13.

* * * * *